US011709782B2

(12) United States Patent
Monti et al.

(10) Patent No.: US 11,709,782 B2
(45) Date of Patent: Jul. 25, 2023

(54) MEMORY ADDRESS TRANSLATION

(71) Applicant: Arm Limited, Cambridge (GB)

(72) Inventors: Paolo Monti, Quattordio (IT); Abdel Hadi Moustafa, Nice (FR); Albin Pierrick Tonnerre, Nice (FR); Vincenzo Consales, Golfe Juan (FR); Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/512,888

(22) Filed: Oct. 28, 2021

(65) Prior Publication Data

US 2023/0135599 A1 May 4, 2023

(51) Int. Cl.
*G06F 12/10* (2016.01)
*G06F 12/1027* (2016.01)

(52) U.S. Cl.
CPC ...... *G06F 12/1027* (2013.01); *G06F 2212/68* (2013.01)

(58) Field of Classification Search
CPC .......... G06F 12/1027; G06F 2212/68
USPC ........................................... 711/207
See application file for complete search history.

(56) References Cited

U.S. PATENT DOCUMENTS 10,621,107 B1 * 4/2020 Monti ................. G06F 12/1036
2016/0350225 A1 * 12/2016 Podaima ................. G06F 12/10
2019/0026159 A1 * 1/2019 Haderbache .......... G06F 12/145

* cited by examiner

*Primary Examiner* — Hua J Song
(74) *Attorney, Agent, or Firm* — Nixon & Vanderhye P.C.

(57) ABSTRACT

Circuitry comprises a translation lookaside buffer to store memory address translations, each memory address translation being between an input memory address range defining a contiguous range of one or more input memory addresses in an input memory address space and a translated output memory address range defining a contiguous range of one or more output memory addresses in an output memory address space; in which the translation lookaside buffer is configured selectively to store the memory address translations as a cluster of memory address translations, a cluster defining memory address translations in respect of a contiguous set of input memory address ranges by encoding one or more memory address offsets relative to a respective base memory address; memory management circuitry to retrieve data representing memory address translations from a memory, for storage by the translation lookaside buffer, when a required memory address translation is not stored by the translation lookaside buffer; detector circuitry to detect an action consistent with access, by the translation lookaside buffer, to a given cluster of memory address translations; and prefetch circuitry, responsive to a detection of the action consistent with access to a cluster of memory address translations, to prefetch data from the memory representing one or more further memory address translations of a further set of input memory address ranges adjacent to the contiguous set of input memory address ranges for which the given cluster defines memory address translations.

17 Claims, 14 Drawing Sheets

| VA>>3 | PA>>4 | PA_0 | PA_1 | PA_2 | PA_3 | PA_4 | PA_5 | PA_6 | PA_7 |
|---|---|---|---|---|---|---|---|---|---|
| 0x840 | 0x8820 | 0 | 1 | 5 | 6 | 14 | 15 | X | 3 |

| VA>>3 | PA>>5 | PA_0 | PA_1 | PA_2 | PA_3 | PA_4 | PA_5 | PA_6 | PA_7 |
|---|---|---|---|---|---|---|---|---|---|
| 0x840 | 0x8820 | 0 | 1 | 5 | 6 | 14 | 15 | 21 | 3 |

| VA0 | VA1 | VA2 | VA3 | VA4 | VA5 | VA6 | VA7 |
|---|---|---|---|---|---|---|---|
| PAx | PAy | ... | ... | ... | ... | ... | PAz |

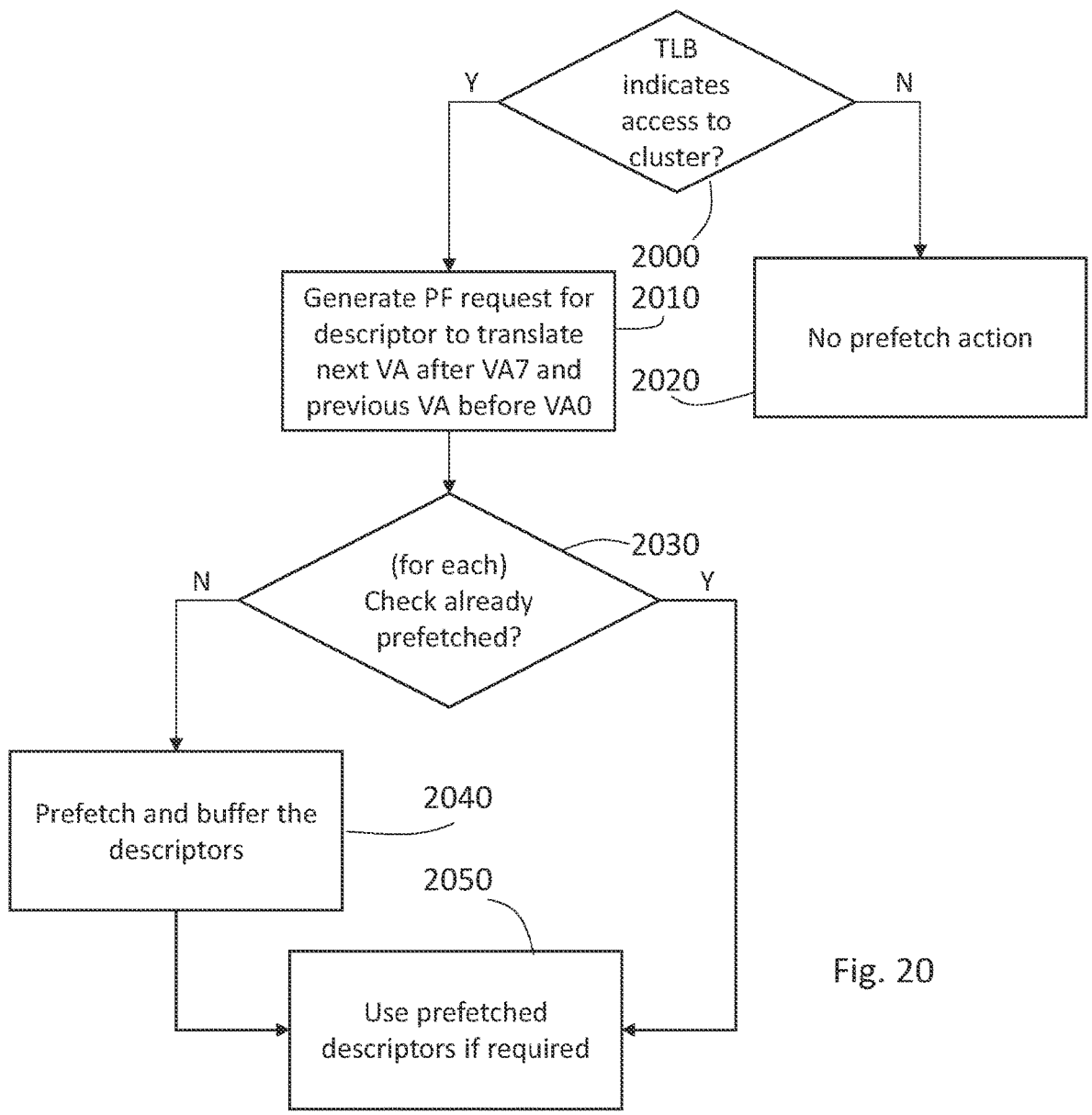

MEMORY ADDRESS TRANSLATION

BACKGROUND

This disclosure relates to memory address translation.

Memory address translation apparatus, such as management units (MMUs), attend to the translation of virtual memory addresses into physical memory addresses.

A data processing apparatus typically provides each running program with access to a virtual address space defined by virtual memory addresses. Each program sees its own virtual address space which contains instructions and data for use by that program. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory or a physical memory cache.

A cache sometimes known as a translation lookaside buffer (TLB) may be used as part of the address translation process. The TLB stores recently or commonly used translations between virtual and physical memory addresses. So, as a first step in an address translation process, the TLB is consulted to detect whether the TLB already contains the required address translation. If not, then a more involved translation process may be used, for example involving consulting so-called page tables holding address translation information, typically resulting in the TLB being populated with the required translation.

SUMMARY

In an example arrangement there is provided circuitry comprising:

a translation lookaside buffer to store memory address translations, each memory address translation being between an input memory address range defining a contiguous range of one or more input memory addresses in an input memory address space and a translated output memory address range defining a contiguous range of one or more output memory addresses in an output memory address space;

in which the translation lookaside buffer is configured selectively to store the memory address translations as a cluster of memory address translations, a cluster defining memory address translations in respect of a contiguous set of input memory address ranges by encoding one or more memory address offsets relative to a respective base memory address;

memory management circuitry to retrieve data representing memory address translations from a memory, for storage by the translation lookaside buffer, when a required memory address translation is not stored by the translation lookaside buffer;

detector circuitry to detect an action consistent with access, by the translation lookaside buffer, to a given cluster of memory address translations; and prefetch circuitry, responsive to a detection of the action consistent with access to a cluster of memory address translations, to prefetch data from the memory representing one or more further memory address translations of a further set of input memory address ranges adjacent to the contiguous set of input memory address ranges for which the given cluster defines memory address translations.

In another example arrangement there is provided a method comprising:

buffering memory address translations, each memory address translation being between an input memory address range defining a contiguous range of one or more input memory addresses in an input memory address space and a translated output memory address range defining a contiguous range of one or more output memory addresses in an output memory address space;

in which the buffering step comprises selectively storing the memory address translations as a cluster of memory address translations, a cluster defining memory address translations in respect of a contiguous set of input memory address ranges by encoding one or more memory address offsets relative to a respective base memory address;

retrieving data representing memory address translations from a memory, for buffering by the buffering step, when a required memory address translation is not stored by the translation lookaside buffer;

detecting an action consistent with access to a given cluster of memory address translations; and in response to a detection of the action consistent with access to a cluster of memory address translations, prefetching data from the memory representing one or more further memory address translations of a further set of input memory address ranges adjacent to the contiguous set of input memory address ranges for which the given cluster defines memory address translations.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 19 schematically illustrates a set of example descriptors; and

FIGS. 20 and 21 are schematic flowcharts illustrating respective methods.

DESCRIPTION OF EMBODIMENTS

Figure 1:
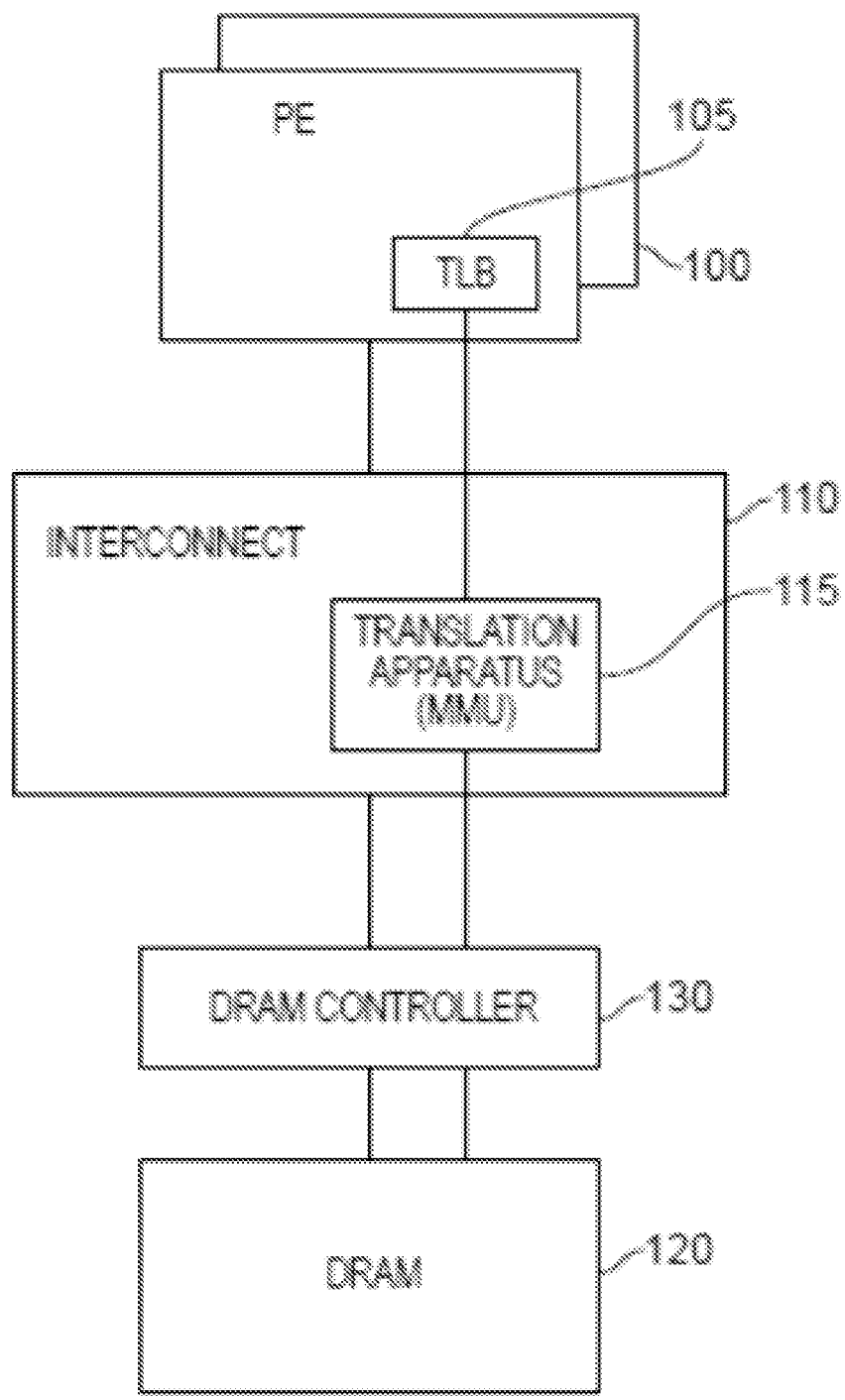
FIG. 1 is a schematic diagram of a data processing apparatus.

Referring now to the drawings, FIG. 1 schematically illustrates an example of a data processing apparatus comprising: one or more processing elements (PE) 100, an interconnect circuit 110, a dynamic random access memory (DRAM) 120 and a DRAM controller 130.

Each of the processing elements 100 can access at least some of the memory locations in the DRAM 120. In principle this access could be directly via actual (physical) memory addresses. However, in order to provide partitioning and a degree of security between memory accesses by different processing elements (or in some cases different operating systems running on the processing elements 100), the processing elements 100 refer to memory addresses by so-called virtual memory addresses. These require translation into output or physical memory addresses to access real (physical) memory locations in the DRAM 120. Such translations are handled by translation apparatus 115 such as a so-called Memory Management Unit (MMU).

This arrangement therefore provides an example of data processing apparatus comprising: a memory 120 accessible according to physical memory addresses; one or more processing elements 100 to generate virtual memory addresses for accessing the memory; and memory address translation apparatus 115 to provide a translation of the initial memory addresses generated by the one or more processing elements to physical memory addresses provided to the memory. In the context of such a translation, the virtual memory addresses may be considered as input memory addresses and the physical memory addresses as output memory addresses.

However, address translation can (from the point of view of a processing element 100) be performed by a translation lookaside buffer (TLB) 105 associated with that processing element. The TLB 105 stores or buffers recently-used translations between virtual memory addresses and physical memory addresses. In operation, the processing element 100 refers a virtual memory address to the TLB 105. Assuming the translation is stored at the TLB 105, the virtual memory address is translated to a physical memory address which then forms part of a memory access to be DRAM 120. However, the TLB has limited size and cannot store every single possible memory address translation which may be called upon by the processing element 100. In the case that a required translation is not present in the TLB 105, the TLB refers the request to the translation apparatus 115, for example forming part of the interconnect circuitry 110. The translation apparatus operates to provide or otherwise obtain the required translation and pass it back to the TLB 105 where it can be stored and used to translate a virtual memory address into a physical memory address.

Example Operation of TLB 105

Figure 2:
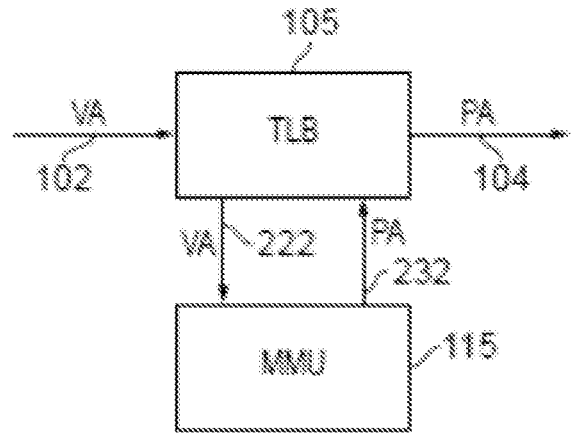
FIG. 2 is a schematic representation of the operation of a translation lookaside buffer.

FIG. 2 schematically illustrates the use of a translation lookaside buffer (TLB) 105. For the purposes of FIG. 2, other items relating to the data communication between the TLB 105 and the MMU 115 are omitted for clarity of the diagram.

Figure 3:
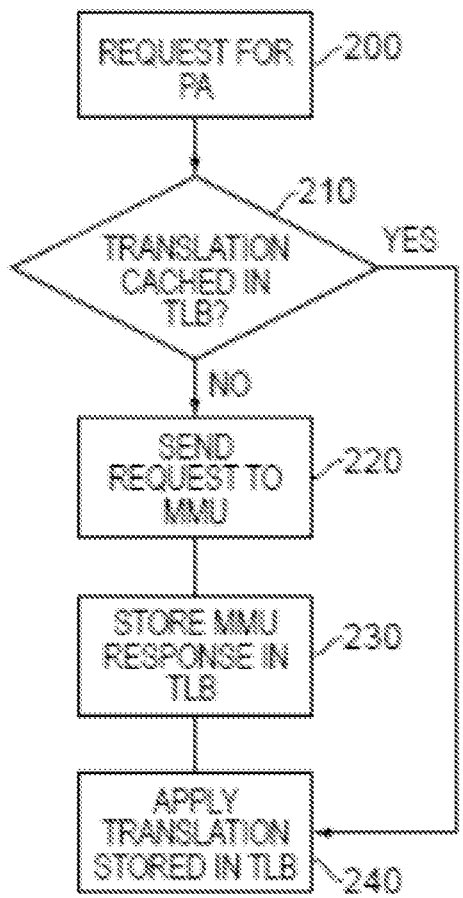
FIG. 3 is a schematic flowchart illustrating a memory address translation operation.

As part of the operation of the processing element (or other module or arrangement with which the TLB 105 is associated), the TLB 105 receives a virtual address (VA) 102 relating to a required memory access. This could of course be a read or a write memory access; it is immaterial to the present discussion which type of memory access is underway. Referring also to FIG. 3 (which is a schematic flowchart illustrating operations of the TLB 105), supply of a VA 102 to the TLB 105 forms a request for a corresponding output PA 104 (shown in FIG. 3 as a step 200).

The TLB 105 contains a cache or store of translations between VA and PA. The criteria by which the TLB 105 stores particular VA to PA translations can be established according to known techniques for the operation of a TLB and will be discussed further below. The cached translations might include recently used translations, frequently used translations and/or translations which are expected to be required soon (such as translations relating to VAs which are close to recently-accessed VAs). Overall, the situation is that the TLB contains a cache of a subset of the set of all possible VA to PA translations, such that when a particular VA to PA translation is required, it may be found that the translation is already held in the cache at the TLB, or it may not.

Accordingly, at a next step 210, the TLB 105 detects whether the required translation is indeed currently cached by the TLB. If the answer is yes, then control passes to a step 240 in which the required translation is applied to the VA 102 to generate the PA 104. However, if the answer is no, then control passes to a step 220 at which the TLB 105 sends a request, comprising the required VA 222, to the MMU 115. The MMU 115 derives the required VA to PA translation (using techniques to be discussed below) and sends at least the PA 232 corresponding to the VA 222 back to the TLB 105 where it is stored at a step 230.

Finally, at the step 240, the TLB 105 applies the translation stored at the TLB 105 to provide the output PA 104.

Example Operation of MMU 115

An example of the operation of the MMU 115 to obtain a required translation of the VA 222 to the PA 232 will now be described.

Figure 4:
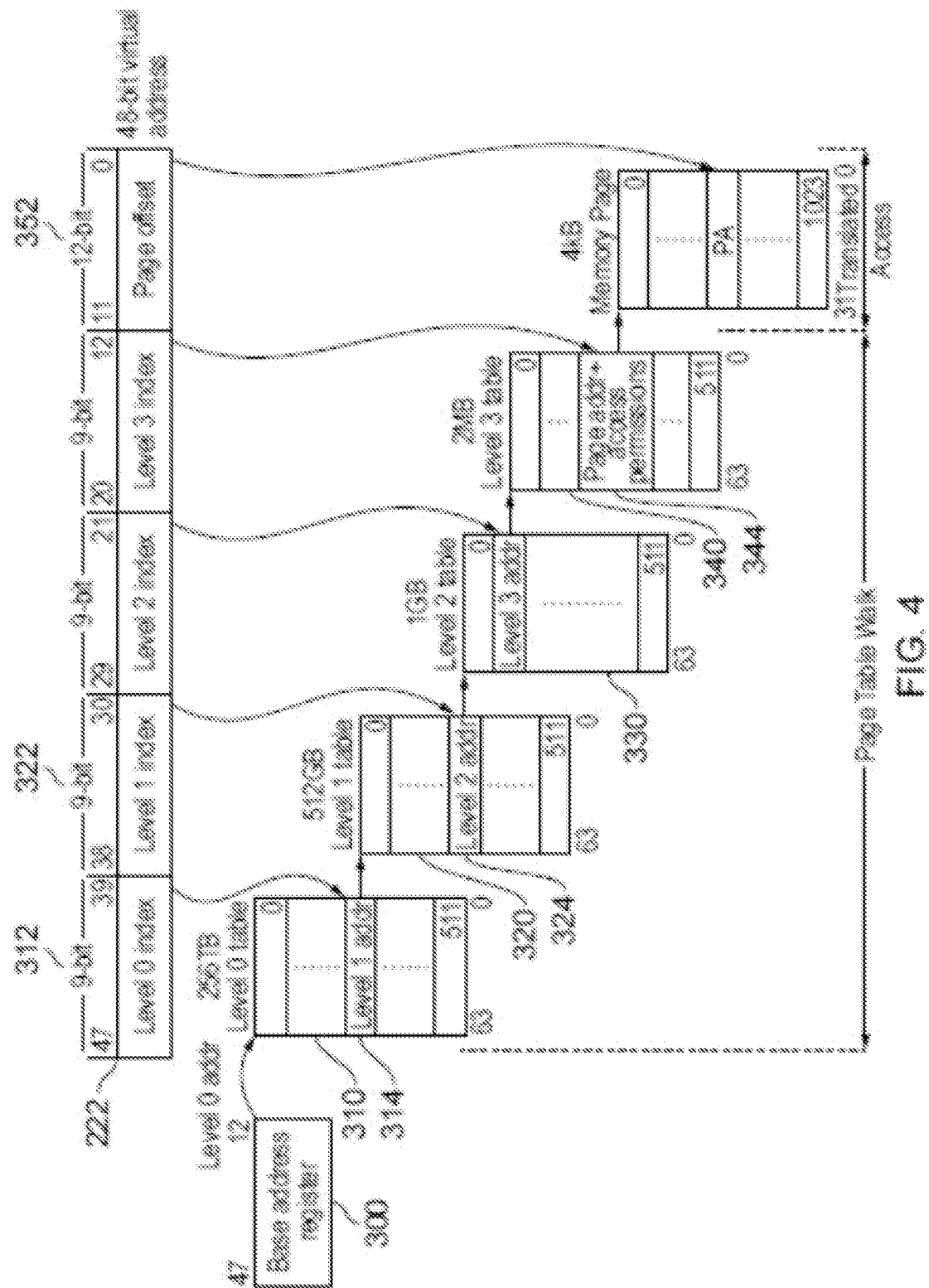
FIG. 4 schematically illustrates a page table walk.
Figure 5:
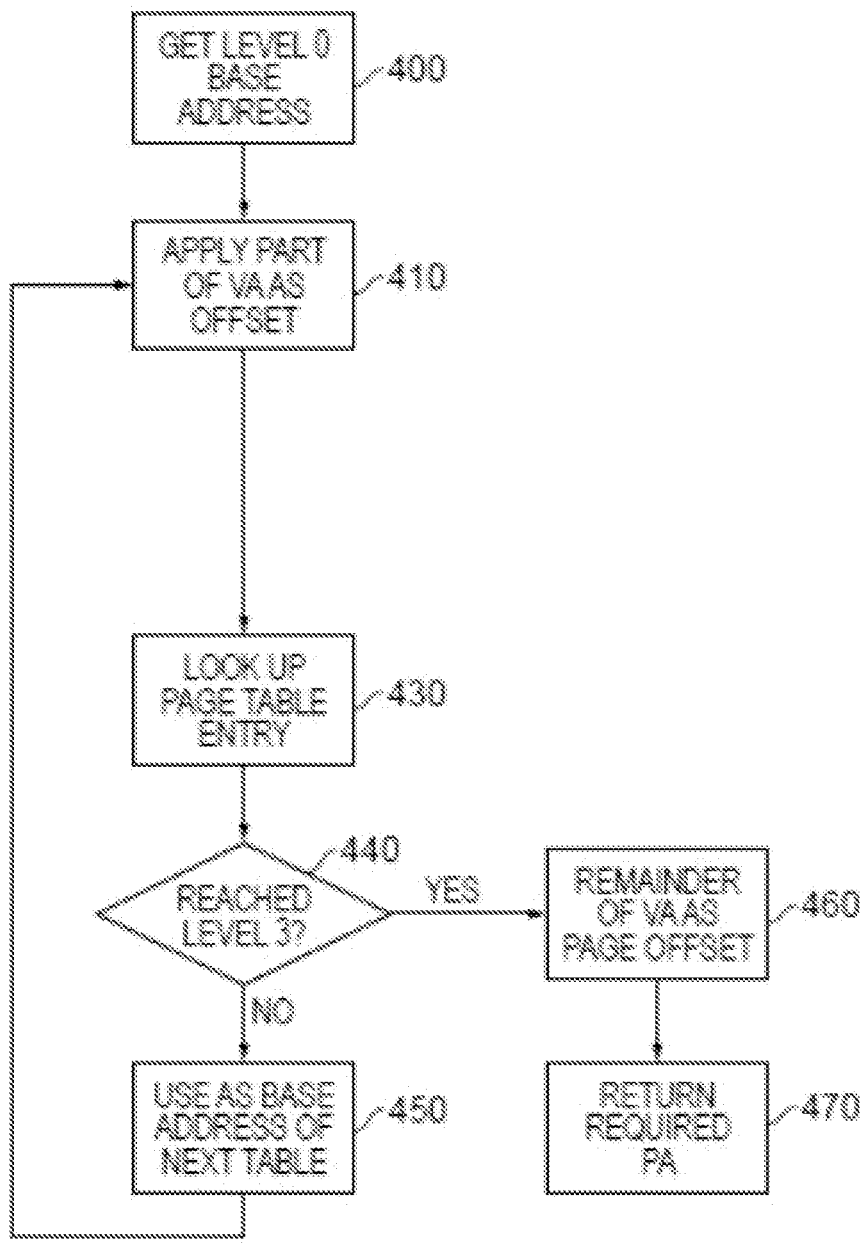
FIG. 5 is a schematic flowchart illustrating the operation of a memory management unit.

FIG. 4 schematically illustrates an example of a stage 1 page table walk (PTW) process, and FIG. 5 is a schematic flowchart illustrating a PTW process.

In this example, a VA 222 which requires translation is formed as a 48-bit value. However, it will be appreciated that the techniques are applicable to addresses of various lengths, and indeed that the length of a VA need not necessarily be the same as the length of a PA.

Different portions of the VA 222 are used at different stages in the PTW process.

To obtain a first entry in the page table hierarchy, in a "level 0 table" 310, a base address stored in a base address register 300 (FIG. 4) is obtained at a step 400 (FIG. 5). A first portion 312 of the VA 222, being the 9 most significant bits, is added to the base address as an offset, at a step 410 so as to provide the PA 314 of an entry in a level 1 table 310. The relevant page table entry is looked up in physical memory or in the level 2 cache 50 (if the relevant page is cached) at a step 430.

At a step 440, a detection is made as to whether "level 3" has been reached in the page table hierarchy. If not, as in the present case, control passes to a step 450 at which the retrieved page table entry is used as a base address of a next table in the hierarchy. The page table entry acts as the next level table in the hierarchy, a "level 1 table" 320. Control returns to the step 410.

At the second iteration of the step 410, a further part 322 of the VA 222, being the next 9 bits [38:30] of the VA 222, forms an offset from the base address of the table 320 in order to provide the PA of an entry 324 in the table 320. This then provides the base address of a "level 2 table" 330 which in turn (by the same process) provides the base address of a "level 3 table" 340.

When the level 3 table has been accessed, the answer to the detection at the step 440 is "yes". The page table entry indicated by the PA 344 provides a page address and access permissions relating to a physical memory page. The remaining portion 352 of the VA 222, namely the least significant 12 bits [11:0] provides a page offset within the memory page defined by the page table entry at the PA 344, though in an example system which stores information as successive four byte (for example 32 bit) portions, it may be that the portion [11:2] provides the required offset to the address of the appropriate 32-bit word.

Therefore, the combination (at a step 460) of the least significant portion of the VA 222 and the final page table entry (in this case, from the "level 3 table" 340) provides (at a step 470) the PA 232 as a translation of the VA 222.

Note that multiple stage MMUs are used in some situations. In this arrangement, two levels of translation are in fact used. A virtual address (VA) required by an executing program or other system module such as a graphics processing unit (GPU) is translated to an intermediate physical address (IPA) by a first MMU stage. The IPA is translated to a physical address (PA) by a second MMU stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation. In a multiple stage MMU, for a VA to IPA translation, the VA may be considered as the input memory address and the IPA as the output memory address. For an IPA to PA translation, the IPA may be considered as the input memory address and the PA as the output memory address.

Memory Address Translations

Figure 6:
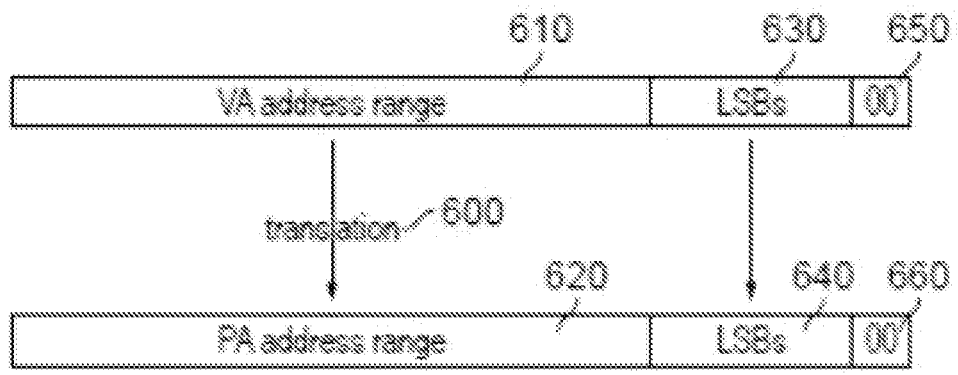
FIG. 6 schematically illustrates an address translation.

FIG. 6 summarises certain aspects of the translation arrangement just described, in that the translation 600 actually concerns a VA page defined by a set 610 of most significant bits referred to in FIG. 6 as the "VA address range". For example, the VA address range may be defined by all but the least significant 12 bits of the VA, providing a VA page size of 4 kB. A translation 600 is defined as between the VA address range 610 and a PA address range 620, being all except the least significant 12 bits of the translated PA. As mentioned above, the least significant bits 630, or at least bits [11:2] of the VA become the corresponding bits 640 of the PA. Depending on the word size of the system in use, one or more least significant bits may be set to 0 so that each VA and each PA refers to a word boundary. For example, in a 32-bit word system, the two least significant bits 650, namely bits [1:0] are tied to 0 in both the VA and (as bits 660) the PA.

TLB Components

Figure 7:
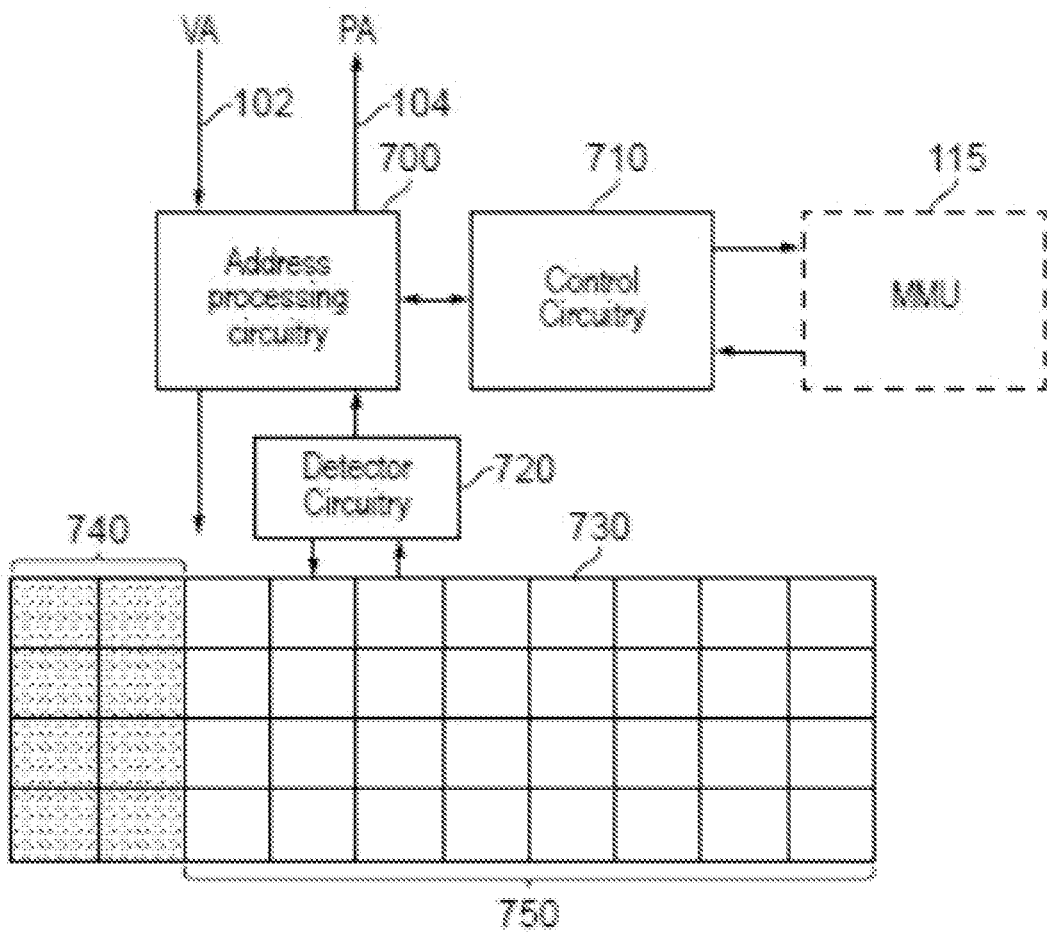
FIG. 7 schematically illustrates a translation lookaside buffer.

FIG. 7 schematically illustrates some components applicable to the TLB 105, whose function will be discussed further below. The TLB 105 comprises address processing circuitry 700 which receives the VA 102 and outputs the PA 104; control circuitry 710 which, amongst other potential functions, interacts with the MMU 115; detector circuitry 720 to be described below; and an array 730 of memory locations drawn as multiple rows, each row including memory locations 740 to store base address values (discussed below) and multiple memory locations 750 to store offset values (again, to be discussed below).

The address processing circuitry 700 provides an example of cluster storage circuitry to detect whether a set of memory address translations retrieved by the memory management circuitry is consistent with storage of that set of memory addresses as a cluster of memory address translations, and to selectively generate and store a cluster defining the set of memory address translations in response to the detection. For example, in response to provision of a memory address translation by the memory management circuitry, the translation lookaside buffer may be configured to detect whether the newly provided memory address translation can be stored in a cluster having a common base input memory address with another memory address translation held by that translation lookaside buffer.

TLB Clustering

The technique of so-called TLB clustering will now be described.

TLB clustering is a technique which allows a single TLB entry to provide the translation of more than one VA into its corresponding PA.

As discussed below with reference to FIG. 12, an access to the MMU 115 can provide an entire cache line of translation data from the MMU, which in turn provides data defining eight memory address translations.

Figures 8, 9:
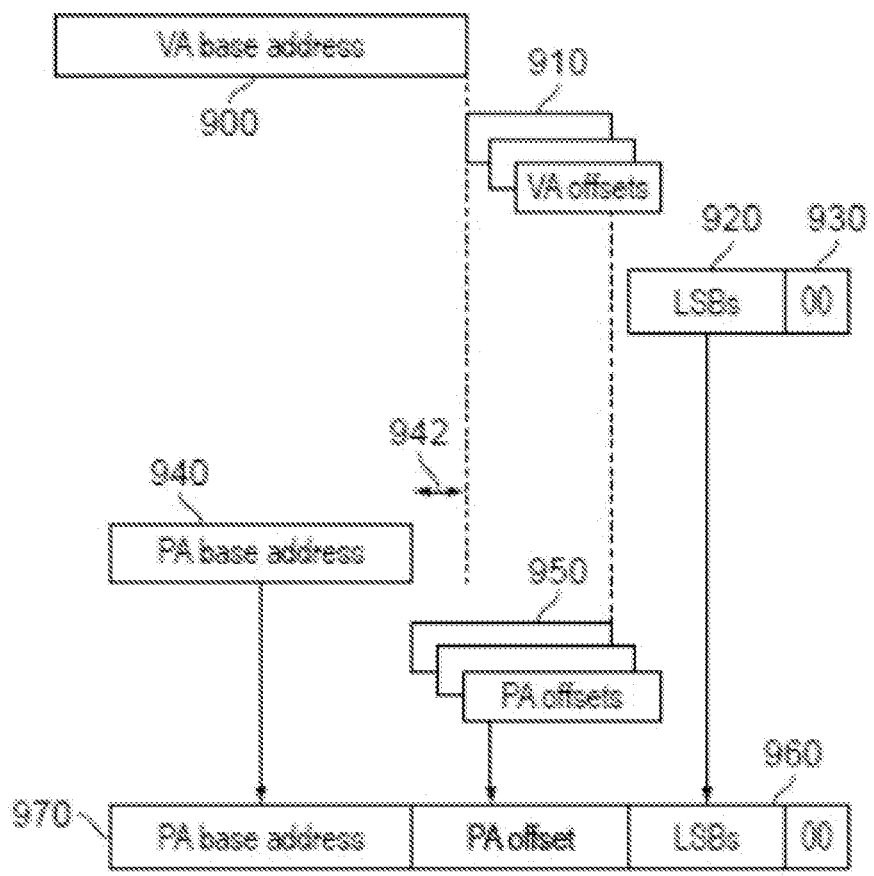
FIG. 8 schematically illustrates a set of address translations.
FIG. 9 schematically illustrates an address translation.

FIG. 8 schematically illustrates an example of such a group of eight memory address translations, as between a virtual address column 800 and a corresponding physical address column 810. Here, the prefix "0x" schematically indicates that the values which follow are expressed in a hexadecimal form. Note that the VA and PA values in FIG. 8 correspond to the page addresses or VA/PA address ranges shown in FIG. 6.

It can be seen that the VA address ranges in the column 800 are consecutive, which is a feature of the single cache line access to the MMU discussed above. The PA address ranges in the column 810 are not consecutive, so that contiguous VA pages are mapped in this example to non-contiguous PA pages.

In a simple TLB clustering approach, the VA address ranges in the column 800 are expressed as a base VA address plus (in an eight-value system) a three-bit offset value, and each VA offset value is associated with a corresponding PA offset value relative to a base PA address. This allows the multiple memory address translation is obtained by the MMU access to a whole cache line to be stored efficiently in the TLB, with a storage penalty relative to the amount of storage needed to hold a single memory address translation equivalent to 7×[number of bits to express each PA offset value].

In the case of the VAs, a base VA address of 0x9c0 (where the three least significant bits are treated as though set to 0 but need not be stored) plus a three-bit offset value ranging from 0-7 (hexadecimal) encompasses all of the VA range values in the column 800. However, the non-contiguous nature of the PA address ranges in the column 810 makes it more difficult to represent the PAs in this example as a three-bit offset relative to a base PA address of (for example) 0x8820. Indeed, of the eight memory address translations shown in FIG. 8, only the first second third fourth and eighth (counting from the top of the table) can be represented by a three-bit offset relative to a base PA address of 0x8820. Example modelling of these arrangements indicates the potential for an average of 3.5 valid entries in each eight-entry cluster, showing that at least some storage capacity in the clustered system is potentially wasted.

Example embodiments of the present disclosure relates to a TLB clustering system in which n bits are used to express the VA offset values and m bits are used to express the PA offset values, in which n does not equal m. In some examples, m>n. An example of this nature will be discussed below with reference to FIG. 9.

Referring to FIG. 9, a VA is defined by a VA base address 900 plus a VA offset 910 of n bits (the combination of the VA base address 900 and the VA offset 910 providing the same information as the VA address range 610 of FIG. 6), plus LSBs 920 (corresponding to the LSBs 630 of FIG. 6), one or more of which 930 may be set to 0 as discussed above.

This is mapped by a memory address translation to a corresponding PA defined by a PA base address 940 plus a PA offset 950 of m bits, where n>m which also implies that the length of the PA base address 940 is smaller (by a margin 942) than the bit length of the VA base address 900, assuming the size of each VA and PA is the same. The PA base address 940 plus the PA offset 950 corresponds to the PA address range 620 of FIG. 6. The LSBs 920 are concatenated as LSBs 960 to form the whole translated PA 970.

Figures 10, 11, 12:
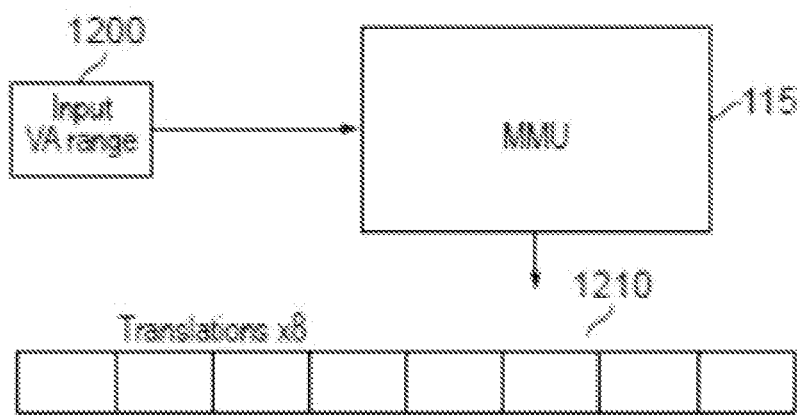
FIGS. 10 and 11 schematically illustrate respective representations of the set of address translations of FIG. 8.
FIG. 12 schematically illustrates an aspect of the operation of a memory management unit.

FIGS. 10 and 11 show respective arrangements in which the VA offsets are defined by three-bit values (indicated in FIGS. 10 and 11 by the notation ">>3") but the PA offsets are defined by four-bit and five-bit values respectively. The set of eight memory address translations under consideration remains the same as that shown in FIG. 8. The VA base address (the left-hand column of FIGS. 10 and 11) and the PA base address (the second-left column of FIGS. 10 and 11) can be stored in the TLB in the portion 740 of FIG. 7, and the PA offset values can be stored in respective entries in the portion 750 of FIG. 7, such that the VA offset (0 . . . 7) is implied (rather than needing to be expressly indicated) by a location within the set of entries in the portion 750, counting from 0 at the left to 7 at the right.

In FIG. 10, which uses a four-bit PA offset, all except the penultimate PA can be represented as a four-bit offset relative to the base address of 0x8820.

In FIG. 11, which uses a five-bit PA offset, all of the memory address translations of FIG. 8 can be represented by the clustered approach.

Therefore, while maintaining the three-bit VA offset, significant efficiency gains can be made in terms of allowing more memory address translations to be stored in the clustered TLB, by increasing the number of bits available to store each PA offset to a value higher than three bits.

In increasing the number of bits applicable to each PA offset value, the additional storage overhead is relatively small; only 7 bits are added to each row of the TLB for each additional bit of PA clustering, which in many example arrangement is less than 4% of the bits already used by a TLB entry. There is no impact on timing latency, as the computation of a TLB hit during a lookup is unaffected.

In addition, the potential gain in storage efficiency provided by this technique could be used to compensate for the effect of reducing the overall TLB size. For example, removing two ways from an eight-way TLB would reduce its size by 25% but by adding the present technique as well, the reduced-size TLB could so be more effective and less expensive in terms of area and power than a full-sized TLB not using this technique.

MMU Operation Example

FIG. 12 schematically summarises the operation of the MMU 115 as discussed above, in which the input of a single input VA range 1200 gives rise to 8 output translations 1210 relating to consecutive VA ranges including the input VA range 1200.

In these examples, although other figures can be used, each cluster defines $2^n$ memory address translations; and each offset applicable to an input memory address range comprises a respective n-bit offset. For example, n may equal 3. The memory management circuitry may be configured to retrieve data representing a group of $2^n$ memory address translations from the memory.

Handling Translation Requests at the TLB

Figure 13:
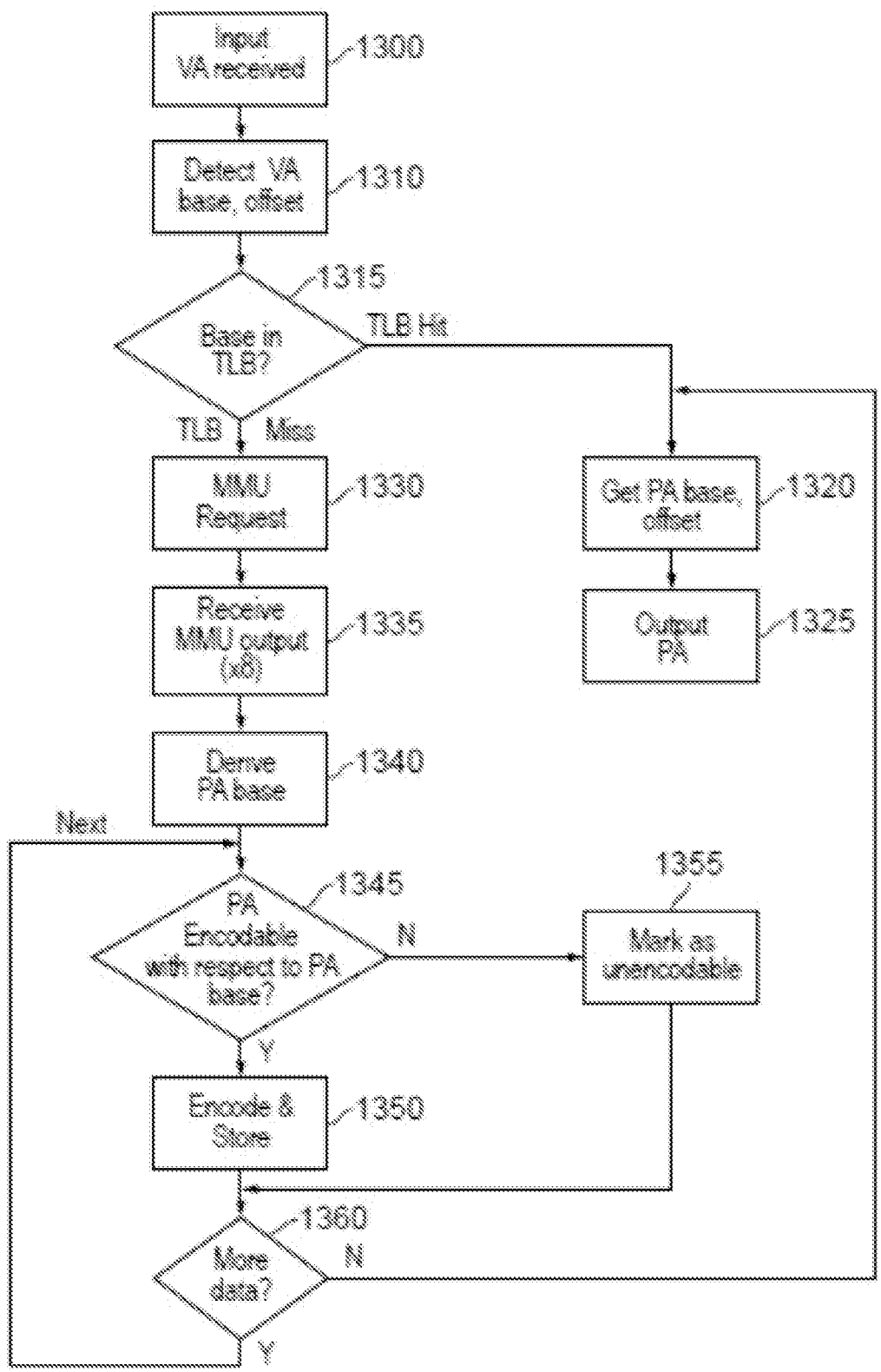
FIGS. 13 and 14 are schematic flowcharts illustrating respective methods.

FIG. 13 represents an expansion of the basic flowchart of FIG. 3, relating to the use of the clustered TLB approach discussed above.

At a step 1300, an input VA is received as a request for a corresponding PA.

At a step 1310 the TLB (in particular, the address processing circuitry 700) detects a VA base address and offset value applicable to the received VA.

At a step 1315, the detector circuitry 720 detects whether the VA base address is present in a TLB entry (a row as represented in FIG. 7). If the answer is yes, or in other words there is a TLB hit, then control passes to a step 1320 at which the corresponding PA base and offset values are retrieved and the required PA is output at a step 1325 as a combination of the retrieved PA base and offset values.

If, at the step 1315, there is a TLB miss then the control circuitry 710 issues a request at a step 1330, to the MMU 115, for the required translation. At a step 1330 the MMU 115 provides a whole cache line of eight translations.

At a step 1340 the address processing circuitry derives a PA base value and stores it in the portion 740 of the current TLB entry. Then, for each of the eight memory address translations received at the step 1335, the address processing circuitry 700 detects at a step 1345 whether the respective PA is encodable with respect to the PA base value derived at this step 1340, using the number of bits (m) available to encode each offset value. If the answer is yes, then at a step 1350 the memory address translation under consideration is encoded as an offset value and stored. If the answer at the step 1345 is no, then the relevant entry is marked (at a step 1355) as unencodable.

If, at a step 1360, there are more memory address translations to be processed, then control returns to the step 1345. If not, then control passes to the step 1320 so that the required translation can be output.

Figure 14:
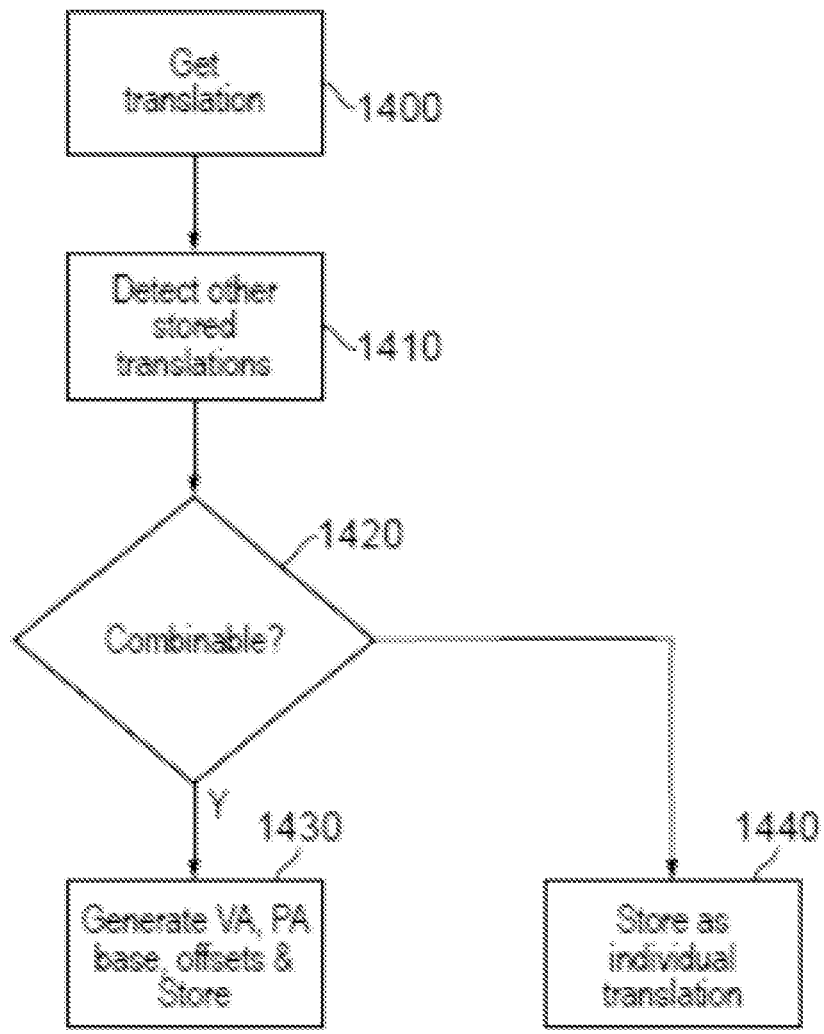

FIG. 14 is a schematic flowchart illustrating a method of combining individual memory address translations obtained from the MMU 115 with other previously stored memory address translations so as to express them as clustered entries, thereby saving storage space in the TLB 105 compared to individual entries.

At a step 1400, the TLB 105 obtains a memory address translation, and at a step 1410 the TLB (for example the control circuitry 710) detects whether any other previously stored translations, held by that TLB or by another TLB in communication with that TLB, could be expressed with a common VA base address with the newly obtained translation.

A step 1420 detects whether such a pair (or more) of memory address translations are combinable into a single entry with a single VA base address and a single PA base address. If the answer is yes then at a step 1430 the entries are combined, the respective VA and PA base addresses and offsets are generated and stored and (if appropriate) the previous individual entry for the one or more other stored translations is deleted. If the answer is no, then at a step 1440 the newly obtained translation is stored as an individual entry in the TLB 105.

Example Data 1210 Received at the Step 1335

Figure 15:
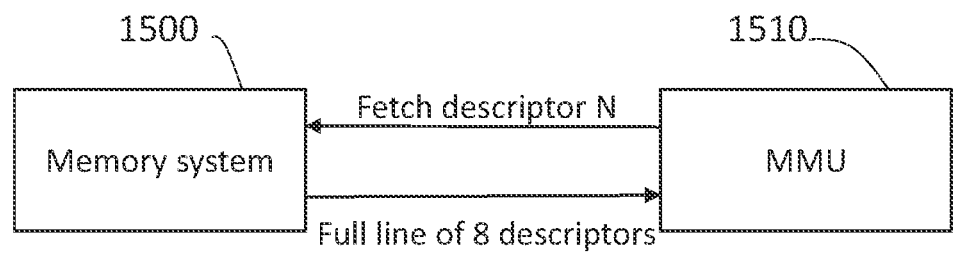
FIG. 15 schematically illustrates the fetching of translation descriptors.

FIG. 15 provides an example in which the MMU 115 issues a request to the memory system 130, 120 of the form generally illustrated in FIG. 1, in respect of a particular memory address translation. In this example, the MMU provides an example implementing a memory management circuitry to retrieve data representing memory address translations from a memory, for storage by the translation lookaside buffer, when a required memory address translation is not stored by the translation lookaside buffer.

Specifically, the MMU 115 attempts to fetch a so-called descriptor indicative of the required memory address translation. In FIG. 15, this is referred to as a descriptor N where N is an arbitrary identifier for the purposes of this description. The descriptor may be retrieved by way of a page table walk or other technique.

In response, the memory system provides a set or line of multiple descriptors. In the present example, 8 descriptors (including the required descriptor N) are provided in response to a request for the descriptor N. This set of 8 descriptors forms the data 1210 of FIG. 12 as received at the step 1335 of FIG. 13.

The descriptors are provided as "raw" data, which is to say in some examples, a VA: PA pair corresponding to each descriptor. The clustering technique described above takes place at the TLB 105 in order to compress multiple instances of descriptors for potentially more efficient storage at the TLB. In example arrangements, the compression into the form of a cluster does not apply to the raw data retrieved by the MMU from the memory system.

The TLB 115 selectively implements clustering as discussed above, and therefore provides an example of a translation lookaside buffer to store memory address translations, each memory address translation being between an input memory address range defining a contiguous range of one or more input memory addresses in an input memory address space and a translated output memory address range defining a contiguous range of one or more output memory addresses in an output memory address space; in which the translation lookaside buffer is configured selectively to store the memory address translations as a cluster of memory address translations, a cluster defining memory address translations in respect of a contiguous set of input memory address ranges by encoding one or more memory address offsets relative to a respective base memory address.

Accordingly, in these examples the memory management circuitry is configured to retrieve, in response to a request to retrieve a translation of a given input memory address range, a data array (for example a set of descriptors) defining two or more memory address translations including a memory address translation of the given input memory address range.

Prefetching Techniques

Figure 16:
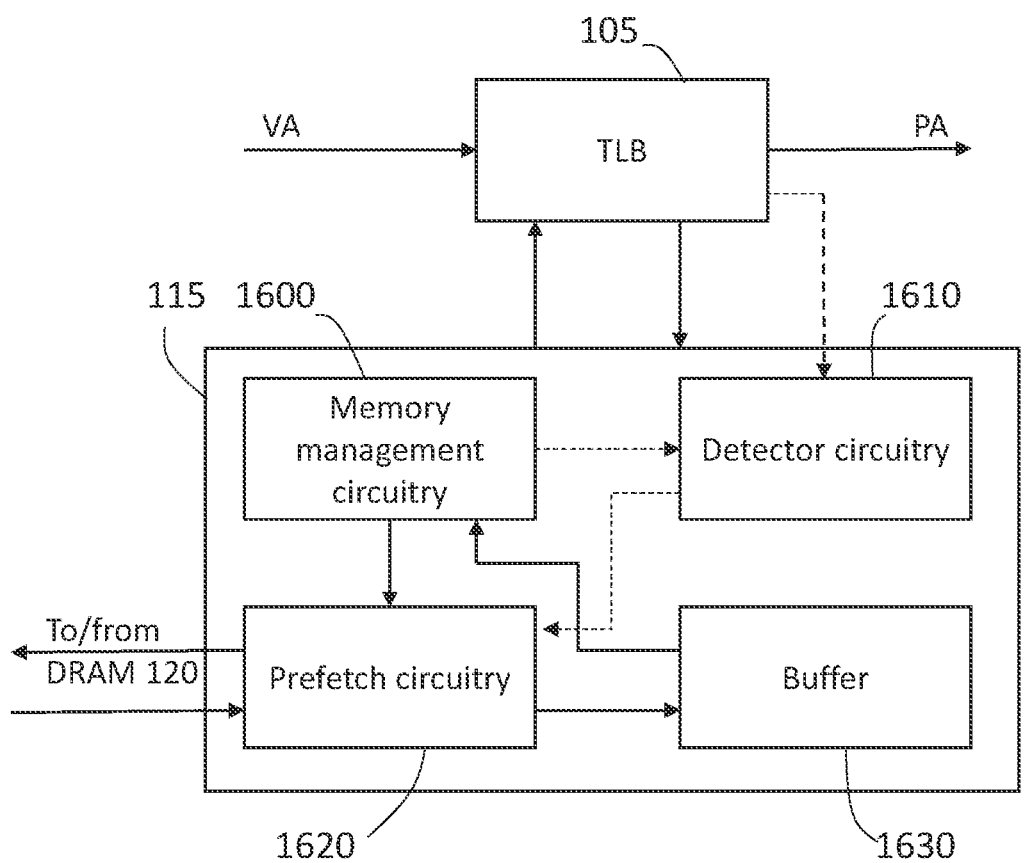
FIG. 16 schematically illustrates an example circuitry.

Referring now to FIG. 16, example circuitry is illustrated in which the TLB 105 operate substantially as described above, but the MMU has some further features which will now be described. Specifically, the MMU 115 comprises memory management circuitry 1600 performing the functions described above and retrieving data representing memory address translations from a memory, for storage by the translation lookaside buffer, when a required memory address translation is not stored by the translation lookaside buffer; detector circuitry 1610; prefetch circuitry 1620 and buffer circuitry 1630.

In general terms, the memory management circuitry 1600 acts to obtain a memory address translation which is currently required by the TLB 105. In contrast, the prefetch circuitry 1620 aims to prefetch, and store in the buffer circuitry 1630, further memory address translations which may shortly (for example, next) be required by the TLB 105. This can potentially improve performance by aiming to ensure that a next-required memory access by the memory management circuitry, for example to retrieve a next line of 8 descriptors, has already been performed by the prefetch circuitry by the time that memory access is needed. The prefetch circuitry 1620 stores pre-fetched descriptors in the buffer circuitry 1630, and the memory management circuitry 1600 is configured to retrieve required descriptors from the buffer circuitry 1630 when those descriptors are already stored by the buffer circuitry 1630. Of course, if prefetching has not correctly anticipated a next required access by the memory management circuitry 1600, the memory management circuitry 1600 can and will obtain the required descriptors from the memory. A potential performance advantage can arise because main memory accesses can involve a relatively high latency, for example several hundred clock cycles, whereas accesses 1630 can potentially be very much quicker than this.

In the present example, prefetching is initiated by or controlled by the detector circuitry 1610. As described below in more detail, the detector circuitry 1610 is configured to detect an action consistent with access, by the translation lookaside buffer, to a given cluster of memory address translations.

The prefetch circuitry 1620 is configured, in response to a detection of the action consistent with access to a cluster of memory address translations, to prefetch data from the memory representing one or more further memory address translations of a further set of input memory address ranges adjacent to the contiguous set of input memory address ranges for which the given cluster defines memory address translations.

Therefore, the buffer circuitry 1630 provides an example of a prefetch buffer (which is schematically drawn separately to the prefetch circuitry 1620 in FIG. 16 for the purposes of explanation, but which may in part of the prefetch circuitry 1620) to store prefetched data from the memory representing one or more further memory address translations. As discussed below, in example arrangements, the prefetch circuitry may be configured not to prefetch data from the memory representing one or more further memory address translations when that data representing one or more further memory address translations is already stored by the prefetch buffer. Similarly, in order to help achieve the potential performance improvements provided by prefetching, the memory management circuitry may be configured to retrieve the data representing memory address translations from the prefetch buffer and, for example, not to initiate and access to main memory) when that data is already stored by the prefetch buffer.

In FIG. 16, the interface to/from the main memory is shown schematically as being provided by the prefetch circuitry 1620. In other words, in some examples, the prefetch circuitry can provide the interface by which the memory management circuitry directly obtains non-prefetched translation descriptors. In other examples, both the memory management circuitry 1600 and the prefetch circuitry 1620 may provide respective interfaces to the main memory, or in further examples, the memory management circuitry 1600 may provide an interface with the main memory such that the prefetch circuitry 1620 itself obtains data via the interface of the memory management circuitry. All of these arrangements are, at a schematic level, technologically the same and the significant technical aspect is that memory accesses can be made either in response to a current requirement of the memory management circuitry 1600 or in response to a prefetch operation.

Criteria to Initiate Prefetching

In the present examples, clusters are generated by the TLB, for example using the techniques described above, when there is a close spatial relationship between successive memory address translations. The present techniques recognise that when an access is made to a virtual address represented within a cluster (whether that is an existing cluster stored by the TLB or the TLB is allocating a new cluster in response to descriptors obtained by the memory management circuitry), there is a likelihood that a next or at least subsequent access will be to a nearby virtual address. In such circumstances, prefetching can potentially be useful.

Use of a Cluster by the TLB

Figures 17A, 17B:
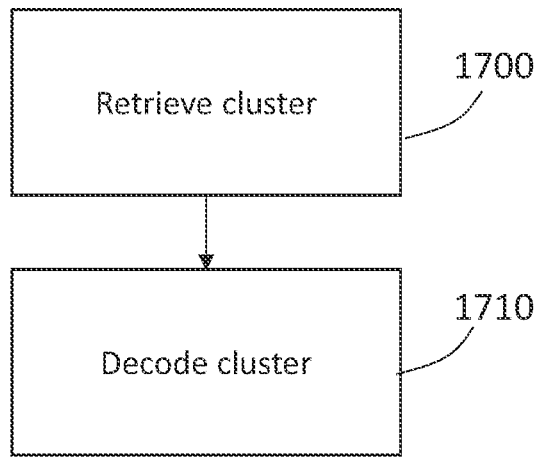
FIG. 17*a* is a schematic flowchart illustrating a method.
FIG. 17*b* schematically illustrates a set of example descriptors.

Referring to FIG. 17a, in order to make use of a cluster, the TLB first retrieves the cluster containing the currently required translation (at step 1700) and, at step 1710, decodes the translation information stored in compressed form by the cluster by combining the base address and offset information for example.

In these examples, therefore, the TLB is configured selectively to retrieve a cluster of memory address translations and to generate a required memory address by decoding one or more memory address offsets relative to a respective base memory address.

Example—Allocation of a New Cluster in the case of allocation of a new cluster by the TLB, in response to a demand request to translate a particular virtual address such as VA1 (FIG. 17b) the memory management circuitry retrieves the set of descriptors shown by FIG. 17b and provides these to the TLB. Note that this retrieval could be from the memory or, if the set of descriptors happens to have been prefetched using the present techniques, the retrieval could be from the buffer circuitry 1620.

The detector circuitry detects that the memory address translation data (the descriptors in this example) retrieved by the memory management circuitry are suitable for storage as a cluster by the TLB, as an example of detecting an action consistent with access to a given cluster of memory address translations. In other words, the detector circuitry does not need to detect actual storage of a cluster but detects that the retrieve data complies with the requirements for storing a cluster such that the logic or circuitry associated with the TLB will store the descriptors as a cluster. For example, the detector circuitry can be configured to detect whether two or more input memory address ranges for which translations are defined by the group of $2^n$ memory address translations retrieved from the memory (for example, VA7 and VA0) are separated by a memory difference consistent with storage of the memory address translations as a cluster. This provides an example in which the input memory address ranges for which translations are defined by the data retrieved from the memory comprise an ordered set of input memory address ranges; and the detector circuitry is configured to detect a separation between a first and a last input memory address range in the ordered set of input memory address ranges.

The detector circuitry detects the highest virtual address (VA7) in the potential new cluster and increments it. This information is obtained directly from the descriptor relating to VA7.

The process of incrementing involves adding to VA7 the unit size separating successive distinct memory addresses. For example, in a system storing 32-bit (4-byte) data words, the next valid address after VA7 is VA7+4.

In response to the detection, assuming the required translation data has not already been prefetched, the prefetch circuitry issues a request for the descriptor that would translate the incremented last virtual address. In the normal manner, this will provide a set of 8 descriptors including the translation of the incremented last virtual address. These 8 descriptors are stored by the buffer circuitry 1630 so as to be available in response to a subsequent potential request by the TLB. Such a request is potentially likely if the pattern of spatial locality of the memory address translations continues.

Figure 18:
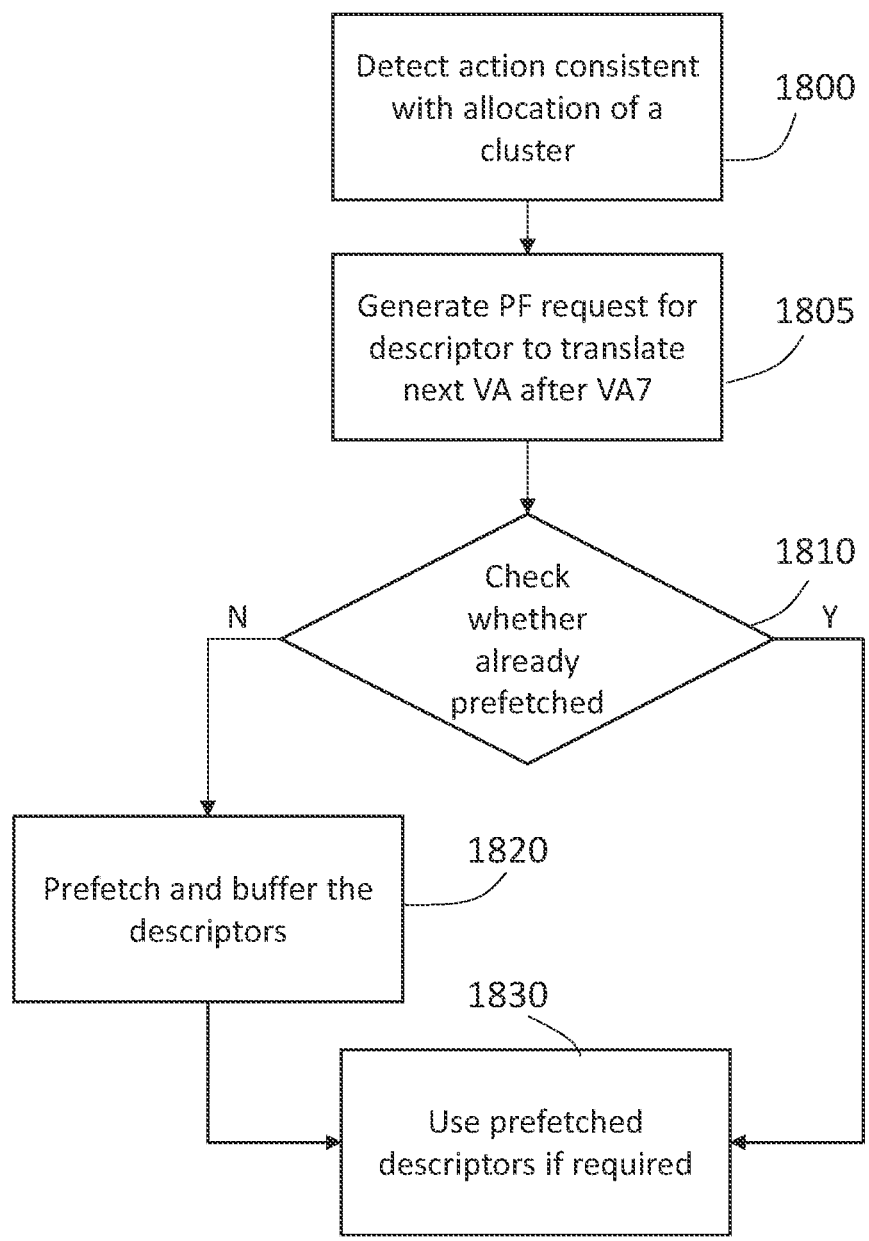
FIG. 18 is a schematic flowchart illustrating a method.

This process is summarised by a flowchart of FIG. 18 with a step 1800 at which an action consistent with allocation of a cluster is detected and at a step 1805 a prefetch request for the descriptor to translate the next valid VA after VA7 is generated.

At step 1810, the prefetch circuitry detects whether the required translation data has already been prefetched to the buffer circuitry 1630. Assuming it has not then control passes to step 1820 at which the data is prefetched by the prefetch circuitry 1620 and buffered by the buffer circuitry 1630, and control passes to step 1830. The "yes" outcome of the step 1810 also passes control to the step 1830. At the step 1830, if and when the TLB makes a request for translation data encompassed by the prefetched descriptors, the prefetched descriptors are used in place of making a further new request to the memory.

This provides an example in which, in response to a detection by the detector circuitry that the data representing memory address translations retrieved by the memory management circuitry is consistent with the generation, by the translation lookaside buffer, of the given cluster, the prefetch circuitry is configured (1800) to prefetch from the memory data representing memory address translations in respect of input memory address ranges following the contiguous set of input memory address ranges represented by the given cluster.

Example—Use of an Existing Cluster

Here, a memory address translation which has been requested of the TLB is in fact available at the TLB and is stored as a cluster by the TLB. Therefore, in this example, in order to service the current translation request, the TLB does not need to request the MMU to obtain translation information from the memory. The MMU does not fetch any descriptors and so the test described above is not performed.

However, the TLB can instead signal to the detector circuitry 1610, for example by a schematic data path 1615, that a cluster is in use. For example, the cluster may concern memory address translations from VA0 to VA7 (FIG. 19), with a current request relating, for example, to VA3 for which the translated physical address provided by the TLB is PAy.

In response to such signalling, the detector circuitry detects that a current cluster is in use, as an example of detecting an action consistent with access to a given cluster of memory address translations. The detector circuitry detects the highest virtual address (VA7) in the current cluster and increments it.

The process of incrementing involves adding to VA7 the unit size separating successive distinct memory addresses. For example, in a system storing 32-bit (4-byte) data words, the next valid address after VA7 is VA7+4.

Similarly, the detector circuitry detects the lowest virtual address (VA0) in the current cluster and decrements it. Similarly, the process of decrementing involves subtracting from VA0 the unit size separating successive distinct memory addresses. For example, in a system storing 32-bit (4-byte) data words, the next valid address before VA0 is VA0−4.

The detection of the highest virtual address VA7 and the lowest virtual address in the current cluster can be achieved by detecting the base address (giving VA0) and also the offset associated with VA7 which gives VA7 when added to the base address.

In response to the detection, assuming the required translation data has not already been prefetched, the prefetch circuitry issues a request for the descriptor that would translate the incremented last virtual address and a request for the descriptor that would translate the decremented first address. In the normal manner, this will provide two respective sets of 8 descriptors including the translation of the incremented last virtual address and the translation of the decremented first address. These sets of 8 descriptors are stored by the buffer circuitry 1630 so as to be available in response to a subsequent potential request by the TLB. Such a request is potentially likely if the pattern of spatial locality of the memory address translations continues.

Referring to FIG. 20, at a step 2000, the detector circuitry detects whether a cluster is being accessed by the TLB. If the outcome is negative, then control passes to step 2020 at which no prefetch action is taken. However, the "yes" outcome of the step 2000 passes to a step 2010 at which prefetch requests are formed for the descriptor to translate the next valid VA after VA7 and the previous VA before VA0. In each instance, at step 2030, a check is performed as to whether the required data is already prefetched. If not, then control passes to step 2040 at which the relevant descriptors are prefetched and buffered. Control passes to step 2050 (also representing the "yes" outcome of the step 2030) at which the prefetched descriptors are used, if required.

This therefore provides an example in which in response to a detection by the detector circuitry of an action consistent with access to the given cluster, when the given cluster is a cluster already stored by the translation lookaside buffer, the prefetch circuitry is configured (2010) to prefetch from the memory data representing memory address translations in respect of input memory address ranges preceding the contiguous set of input memory address ranges and data representing memory address translations in respect of input memory address ranges following the contiguous set of input memory address ranges represented by the given cluster.

Method Example

Figure 21:
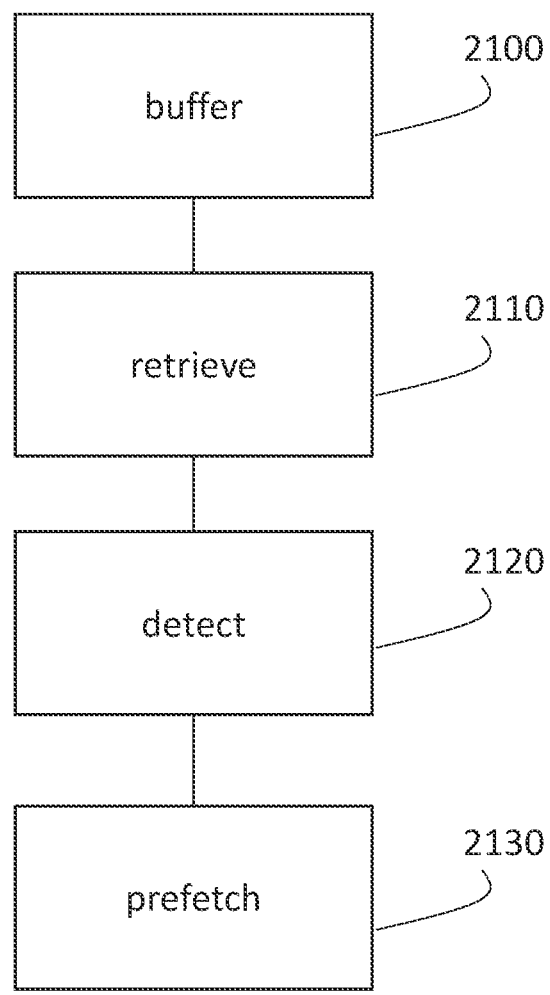

FIG. 21 is a schematic flowchart illustrating an example method comprising:

buffering (at a step 2100) memory address translations, each memory address translation being between an input memory address range defining a contiguous range of one or more input memory addresses in an input memory address space and a translated output memory address range defining a contiguous range of one or more output memory addresses in an output memory address space;

in which the buffering step comprises selectively storing the memory address translations as a cluster of memory address translations, a cluster defining memory address translations in respect of a contiguous set of input memory address ranges by encoding one or more memory address offsets relative to a respective base memory address;

retrieving (at a step 2110) data representing memory address translations from a memory, for buffering by the buffering step, when a required memory address translation is not stored by the translation lookaside buffer;

detecting (at a step 2120) an action consistent with access to a given cluster of memory address translations; and in response to a detection of the action consistent with access to a cluster of memory address translations, prefetching (at a step 2130) data from the memory representing one or more further memory address translations of a further set of input memory address ranges adjacent to the contiguous set of input memory address ranges for which the given cluster defines memory address translations.

Summary Apparatus

The techniques may be implemented in the form shown in FIG. 1, providing an example of data processing apparatus comprising:

a memory 120 accessible according to a physical memory address;

processing circuitry 100 to initiate access to the memory according to a given virtual memory address; and the circuitry of FIG. 16, to translate the given virtual memory address to a corresponding physical memory address to access the memory.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
a translation lookaside buffer to store memory address translations, each memory address translation being between an input memory address range defining a contiguous range of one or more input memory addresses in an input memory address space and a translated output memory address range defining a contiguous range of one or more output memory addresses in an output memory address space;
in which the translation lookaside buffer is configured selectively to store the memory address translations as a cluster of memory address translations, a cluster defining memory address translations in respect of a contiguous set of input memory address ranges by encoding one or more memory address offsets relative to a respective base memory address;
memory management circuitry to retrieve data representing memory address translations from a memory, for storage by the translation lookaside buffer, when a required memory address translation is not stored by the translation lookaside buffer;
detector circuitry to detect an action consistent with access, by the translation lookaside buffer, to a given cluster of memory address translations; and
prefetch circuitry, responsive to a detection of the action consistent with access to the given cluster of memory address translations for which the given cluster is a cluster already stored by the translation lookaside buffer, to prefetch data from the memory representing memory address translations in respect of input memory address ranges preceding the contiguous set of input memory address ranges and/or data representing memory address translations in respect of input memory address ranges following the contiguous set of input memory address ranges represented by the given cluster.

2. The circuitry of claim 1, in which:
the input memory addresses are virtual memory addresses and the input memory address space is a virtual memory address space; and
the output memory addresses are physical memory addresses and the output memory address space is a physical memory address space.

3. Data processing apparatus comprising:
a memory accessible according to a physical memory address;
processing circuitry to initiate access to the memory according to a given virtual memory address; and
the circuitry of claim 2, to translate the given virtual memory address to a corresponding physical memory address to access the memory.

4. The circuitry of claim 1, in which the memory management circuitry is configured to retrieve, in response to a request to retrieve a translation of a given input memory address range, a data array defining two or more memory address translations including a memory address translation of the given input memory address range.

5. The circuitry of claim 1, in which the translation lookaside buffer is configured selectively to retrieve a cluster of memory address translations and to generate a required memory address by decoding one or more memory address offsets relative to a respective base memory address.

6. The circuitry of claim 1, in which the translation lookaside buffer comprises:
cluster storage circuitry to detect whether a set of memory address translations retrieved by the memory management circuitry is consistent with storage of that set of memory addresses as a cluster of memory address translations, and to selectively generate and store a cluster defining the set of memory address translations in response to the detection.

7. The circuitry of claim 6, in which, in response to a detection by the detector circuitry that the data representing memory address translations retrieved by the memory management circuitry is consistent with the generation, by the translation lookaside buffer, of the given cluster, the prefetch circuitry is configured to prefetch from the memory data representing memory address translations in respect of input memory address ranges following the contiguous set of input memory address ranges represented by the given cluster.

8. The circuitry of claim 1, in which:
each cluster defines $2^n$ memory address translations; and
each offset applicable to an input memory address range comprises a respective n-bit offset.

9. The circuitry of claim 8, in which n=3.

10. The circuitry of claim 8, in which the memory management circuitry is configured to retrieve data representing a group of $2^n$ memory address translations from the memory.

11. The circuitry of claim 10, in which the detector circuitry is configured to detect whether two or more input memory address ranges for which translations are defined by the group of $2^n$ memory address translations retrieved from the memory are separated by a memory difference consistent with storage of the memory address translations as a cluster.

12. The circuitry of claim 11, in which:
the input memory address ranges for which translations are defined by the data retrieved from the memory comprise an ordered set of input memory address ranges; and
the detector circuitry is configured to detect a separation between a first and a last input memory address range in the ordered set of input memory address ranges.

13. Circuitry according to claim 1, in which, in response to provision of a memory address translation by the memory management circuitry, the translation lookaside buffer is configured to detect whether the newly provided memory address translation can be stored in a cluster having a common base input memory address with another memory address translation held by that translation lookaside buffer.

14. The circuitry of claim 1, in which the prefetch circuitry comprises a prefetch buffer to store prefetched data from the memory representing one or more further memory address translations.

15. The circuitry of claim 14, in which the prefetch circuitry is configured not to prefetch data from the memory representing one or more further memory address translations when that data representing one or more further memory address translations is already stored by the prefetch buffer.

16. The circuitry of claim 14, in which the memory management circuitry is configured to retrieve the data representing memory address translations from the prefetch buffer when that data is already stored by the prefetch buffer.

17. A method comprising:
buffering memory address translations, each memory address translation being between an input memory address range defining a contiguous range of one or more input memory addresses in an input memory address space and a translated output memory address range defining a contiguous range of one or more output memory addresses in an output memory address space;
in which the buffering step comprises selectively storing the memory address translations as a cluster of memory address translations, a cluster defining memory address translations in respect of a contiguous set of input memory address ranges by encoding one or more memory address offsets relative to a respective base memory address;
retrieving data representing memory address translations from a memory, for buffering by the buffering step, when a required memory address translation is not stored by the translation lookaside buffer;
detecting an action consistent with access to a given cluster of memory address translations; and
in response to a detection of the action consistent with access to the given cluster of memory address translations for which the given cluster is a cluster already stored by the translation lookaside buffer, prefetching data from the memory representing memory address translations in respect of input memory address ranges preceding the contiguous set of input memory address ranges and/or data representing memory address translations in respect of input memory address ranges following the contiguous set of input memory address ranges represented by the given cluster.

* * * * *